United States Patent
Lin

(10) Patent No.: US 8,167,201 B2
(45) Date of Patent: May 1, 2012

(54) COMPOSITE CHIP CARD WITH A SECURITY PROTECTION INTERFACE AND A METHOD FOR CONTROLLING THE SAME

(75) Inventor: Chiao-Li Lin, Taipei (TW)

(73) Assignee: Castles Technology Co., Ltd. (TW)

( * ) Notice: Subject to any disclaimer, the term of this patent is extended or adjusted under 35 U.S.C. 154(b) by 374 days.

(21) Appl. No.: 12/574,764

(22) Filed: Oct. 7, 2009

(65) Prior Publication Data

US 2011/0079646 A1 Apr. 7, 2011

(51) Int. Cl.
*G06K 5/00* (2006.01)

(52) U.S. Cl. .................................. 235/382; 235/380

(58) Field of Classification Search .................. 235/382, 235/380, 492, 493, 383, 375
See application file for complete search history.

(56) References Cited

U.S. PATENT DOCUMENTS

| | | | | |
|---|---|---|---|---|
| 6,394,347 | B1 * | 5/2002 | Kitai et al. ................... | 235/440 |
| 2002/0040930 | A1 * | 4/2002 | Kitai et al. ................... | 235/440 |
| 2002/0153424 | A1 * | 10/2002 | Li ................................. | 235/492 |
| 2009/0200367 | A1 * | 8/2009 | Arnouse ....................... | 235/375 |
| 2011/0140841 | A1 * | 6/2011 | Bona et al. ................... | 340/5.83 |
| 2011/0240748 | A1 * | 10/2011 | Doughty et al. ............. | 235/492 |

* cited by examiner

Primary Examiner — Thien M Le

(57) ABSTRACT

A composite chip card with a security protection interface and a method for controlling the same are provided. The chip card comprises a carrier, at least one induction coil, at least one chip module, and at least one security protection interface. The security protection interface further comprises a mechanical security protection module and a control unit. The induction coil, the chip module, and the security protection interface are all provided on the carrier. The chip module is electrically connected to the induction coil. The mechanical security protection module is electrically connected to the chip module. The control unit is electrically connected to the mechanical security protection module. The method for controlling the composite chip card includes: contacting a system related to issue of the chip card, by a user of the composite chip card; then activating the security protection interface of the composite chip card; and finally performing a contactless payment transaction.

10 Claims, 5 Drawing Sheets

COMPOSITE CHIP CARD WITH A SECURITY PROTECTION INTERFACE AND A METHOD FOR CONTROLLING THE SAME

BACKGROUND OF THE INVENTION

1. Technical Field

The present invention relates to a composite chip card with a security protection interface and a method for controlling the same. More particularly, the present invention relates to a composite chip card integrated with an induction coil, a chip module, and a security protection interface, and to a method for controlling the composite chip card.

2. Description of Related Art

As global economy grows with heated competition among its participants, plastic money has been a widely used and almost indispensable tool for purchases, payment, and various commercial transactions in all developed countries and regions. In fact, the plastic money is now as important as the traditional currency.

In recent years, plastic money has benefited from the continuous progress and miniaturization of integrated circuits (ICs). Lately, plastic money is integrated with miniaturized ICs to form chip cards which have more functions and wider applicability than without the ICs. The types of chip cards have evolved with consumers' needs from contact cards (e.g., credit cards, ATM cards, and health insurance cards) to contactless cards (e.g., EasyCards and access control cards). Nowadays, there have also been composite chip cards, which have both contact and contactless interfaces, such as the Visa Wave card issued by VISA (Visa International Service Association), intelligent ID cards, and electronic purses.

The contactless cards work on the principle of Radio Frequency Identification (RFID), as illustrated in FIG. 1. An RFID system essentially includes at least one tag A10, a reader A20, and a host A30. The tag A10 is configured for storing all kinds of information about a user. The reader A20 is a tool for reading information from or storing information into the tag A10. The reader A20 transmits the read the information to the host A30, which decodes the information with various application programs and thereby assists the user in making the right decision promptly. The tag A10 further includes a radio-frequency module A11, a microprocessor A12, and an Electrically Erasable Programmable Read-Only Memory (EEPROM) A13. Upon sensing radio waves emitted by the reader A20, the tag A10 generates an "alternating magnetic field". Consequently, the radio-frequency module A11 and the microprocessor A12 of the tag A10 are activated to transmit information in the EEPROM A13 to the reader A20. The reader A20 then transmits data to the host A30 through wires or a network.

The tag A10 can be either active or passive. An active tag A10 includes a battery and can transmit information to the reader A20 at any time. Besides, the active tag A10 has a relatively long communication distance and a relatively large memory, though at a relatively high price. On the other hand, a passive tag A10 is powered by an induced micro-current generated in the tag A10 due to electric waves emitted by the reader A20. The passive tag A10 uses the same electric waves to transmit information back to the reader A20 and therefore has a relatively short communication distance. The passive tag A10 has such advantages as no need for battery, small volume, low price, long service life, and digital information portability. The passive tag A10 has a built-in antenna for sensing and generating radio-frequency waves and thereby receiving and transmitting data.

The reader A20 includes a radio-frequency module A21 and a microprocessor A22. The host A30 and the various application programs serve to control the reader A20 in data receipt, transmission, identification, and management.

Presently, the ISO standards applicable to the RFID industry include ISO 14443 for proximity coupling smart cards and ISO 15693 for vicinity coupling smart cards. ISO 14443 defines an operation standard for smart cards which are read in a contactless manner within a distance of 10 cm, and most mass transportation passes fall into this category of smart cards. ISO 15693, on the other hand, is an operation standard for smart cards with a reading distance up to 1 m and is applicable to access control cards in general. While both standards are applicable mainly to smart cards, a comparison of their features is presented in Table 1.

TABLE 1

Comparison between ISO 14443 and ISO 15693

| Function | ISO 14443 | ISO 15693 |
|---|---|---|
| Operating frequency | 13.56 MHz | 13.56 MHz |
| Reading distance | Proximity | Vicinity |
| Chip type | Microcontroller unit (MCU) or wired logic memory (an electronic circuit without MCU) | Wired logic memory |
| Memory capacity | 64 byte~64K | 256 byte~2 KB |
| Readability and writability | Readable and writable | Readable and writable |
| Data transfer rate (kbps) | Up to 106, can be increased to 848 | Up to 106 |
| Anti-impact | Yes | Yes |

In addition, the ISO 18000 series for item management is the first set of international standards for wireless communication technology used in logistic systems. In view of the importance of supply chain management, ISO (International Organization for Standardization) organized an ISO/IEC team for preparing the 18000 series standards as RFID air interface guidelines for item management. Currently, the ISO 18000 series includes six parts, as shown in Table 2. The most important part of the series is ISO 18000-6, whose target frequency range, namely 860~930 MHz, is the optimal choice for logistic management. Therefore, ISO 18000-6 has been a major international standard for supply chain RFID application techniques.

TABLE 2

ISO 18000 series standards

| Part | Content | Field of application |
|---|---|---|
| 18000-1 | General parameters for air interface communication (AIC) at globally acceptable frequencies | |
| 18000-2 | Parameters for AIC below 135 MHz | Short-range paper-based tags, such as access control cards |
| 18000-3 | Parameters for AIC at 13.56 MHz | Wired logic memory |
| 18000-4 | Parameters for AIC at 2.456 GHz | Long-range applications, such as real-time locating systems |
| 18000-5 | Parameters for AIC at 5.8 GHz | 18000-5 has been withdrawn. |
| 18000-6 | Parameters for AIC at 860~930 MHz | Most suitable for logistic and asset management |

TABLE 2-continued

ISO 18000 series standards

| Part | Content | Field of application |
| --- | --- | --- |
| 18000-7 | Parameters for AIC at 433.92 MHz | Similar to 18000-6, though with a lower reading speed and more susceptible to interference by other communication equipments |

Further, a brief description of the transaction specifications of Visa Wave is presented below. In order to expedite transaction in channels which only involve small transaction amounts, a Visa Wave cardholder is not required to sign if the transaction amount is not greater than NT$ 3000. Moreover, the issuer bank of a Visa Wave card is entitled to decide whether an ordinary "on-line transaction" processing procedure or a faster "off-line transaction" processing procedure applies to a particular transaction, based on risk control considerations. Off-line transaction is as safe as on-line transaction because each Visa Wave card has an "accumulated risk allowance". When the accumulated transaction amount exceeds a certain limit, the "on-line transaction" processing procedure will automatically apply, and in consequence the transaction will be verified with the issuer bank through a terminal to ensure payment security.

Today, on-line transaction is the major transaction mode. According to the on-line transaction processing procedure, each transaction must be communicated to the issuer bank via a terminal and cannot be closed unless the terminal receives confirmation and authorization from the bank; therefore, the time required for each transaction is about 30 seconds. By contrast, off-line transaction is a transaction mode designed for merchants conducting small transactions and requiring payments to be processed rapidly. When a cardholder performs an off-line transaction, the transaction can be completed without being communicated to the issuer bank for authorization; hence, it only takes approximately two to five seconds to close the transaction.

Existing composite chip cards are provided with various advanced encryption mechanisms built in the chips and use dynamic data authentication (DDA) to increase the security of transaction and data transfer, thereby effectively preventing card data from being stolen and remotely copied during transaction. However, as consumers usually carry the cards with them for convenience of use, and the composite chip cards can be sensed by means of wireless signals, there have been instances where crooks used wireless transmitters and sensors to capture card data, and such illegal activities are very difficult to detect and control. Therefore, it is a serious and pressing issue to protect composite chip cards from data theft and subsequent fraudulent use.

As a solution to the foregoing issue, the present invention provides a simple yet effective device and method incorporating a security protection interface so as to prevent consumer data from theft, and chip cards from unauthorized use, thereby enhancing the security of composite chip cards while they are carried around and used.

BRIEF SUMMARY OF THE INVENTION

In view of the aforesaid problems of the prior art, the inventor of the present invention put years of experience, as well as imagination and creativity, into practice and, after repeated trials and modifications, finally developed a composite chip card with a security protection interface and a method for controlling the same as disclosed herein.

The first objective of the present invention is to provide a composite chip card with a security protection interface, wherein the composite chip card includes at least one induction coil, at least one chip module, and at least one security protection interface. The security protection interface further includes a sensing-type security protection module and a control unit. The sensing-type security protection module activates a security protection mechanism through sensing and thereby enables transaction. Thus, the security of use of the composite chip card is increased.

The second objective of the present invention is to provide a composite chip card with a security protection interface, wherein the composite chip card includes at least one induction coil, at least one chip module, and at least one security protection interface. The security protection interface further includes a mechanical security protection module and a control unit. The mechanical security protection module controls the execution of a transaction according to whether or not a mechanical structure is changed. Thus, the security of use of the composite chip card is enhanced.

The third objective of the present invention is to provide a method for controlling a composite chip card with a security protection interface. When it is desired to perform a transaction through the composite chip card with the security protection interface, the security protection interface of the composite chip card must be activated beforehand; otherwise, the transaction cannot be executed. Thus, the security of use of the composite chip card is ensured.

To achieve the foregoing objectives, the present invention provides a composite chip card with a security protection interface, wherein the composite chip card includes a carrier, at least one induction coil capable of receiving and transmitting electric waves, at least one chip module, and at least one security protection interface.

The induction coil is provided on the carrier. The chip module is also provided on the carrier and is electrically connected to the induction coil.

The security protection interface is provided on the carrier, too. The security protection interface further comprises a security protection module connected to the chip module, and a control unit connected to the security protection module. The security protection module is a sensing-type security protection module or a mechanical security protection module.

To achieve the foregoing objectives, the present invention also provides a method for using a composite chip card with a security protection interface, wherein the method is applicable to contactless payment transaction and comprises the following steps. At a first step, a user of the composite chip card contacts a system related to issue of the composite chip card so as to activate the composite chip card. The first step further includes verifying user-related data and setting a dynamic data authentication function of the composite chip card. Then, at a second step, the security protection interface of the composite chip card is activated by setting and storing an actuation condition of the security protection interface, and activating functions of the security protection interface. At a third step, a contactless payment transaction is executed through the composite chip card with a profit-making organization of a contactless payment system. The third step further includes: deactivating the security protection interface; sensing, receiving, and verifying various pieces of information related to the user and to the transaction, through a terminal device of the contactless payment system; generating a transaction verification; completing the transaction; and finally reactivating the security protection interface of the composite chip card.

Thus, according to the present invention, the composite chip card with the security protection interface and the method for controlling the same reduce the risk of the composite chip card being remotely copied or fraudulently swiped while the composite chip card is carried around or used by the user. Consequently, the security of use of the composite chip card is ensured.

BRIEF DESCRIPTION OF THE SEVERAL VIEWS OF THE DRAWINGS

The advantages and concept of the present invention will be best understood by referring to the following detailed description in conjunction with the accompanying drawings. However, the drawings are provided for illustrative purposes only but are not intended to restrict the scope of the present invention. In the drawings.

DETAILED DESCRIPTION OF THE INVENTION

In order to achieve the aforementioned objectives and effects, the inventor of the present invention integrated a security protection interface with a conventional sensing-type chip card, devised various security protection mechanisms for increasing security protection levels, and finally obtained a composite chip card with a security protection interface and a method for controlling the same. The system structure and control method of the present invention are detailed hereinafter with reference to a composite chip card with a security protection interface according a first preferred embodiment, a composite chip card with a security protection interface according a second preferred embodiment, and a method for controlling a composite chip card with a security protection interface, as shown in the accompanying drawings.

Figure 1:
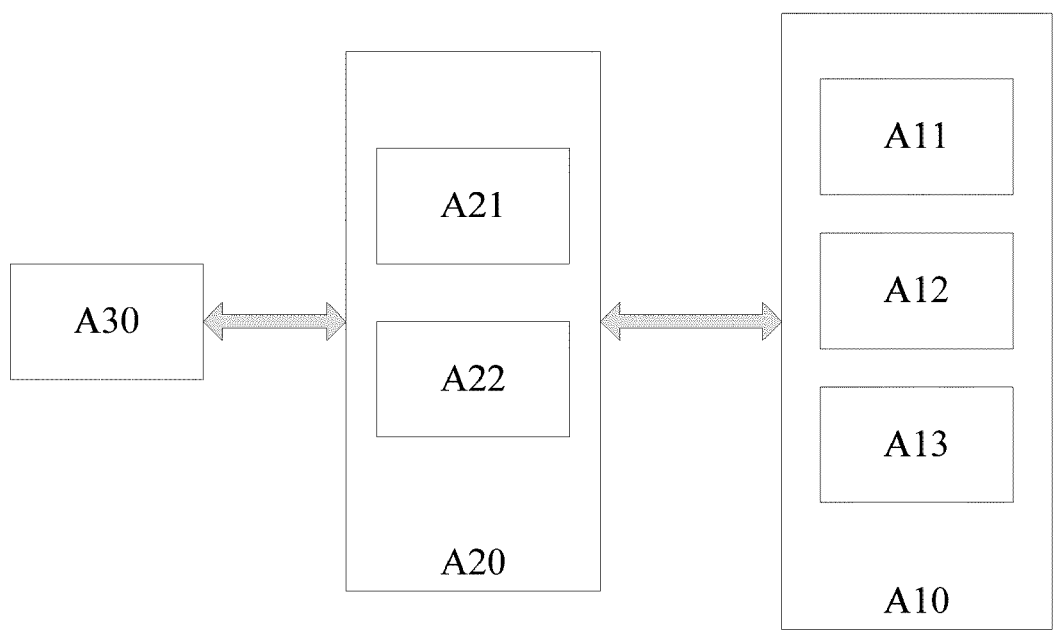
FIG. 1 illustrates the operating principle of RFID.
Figure 2A:
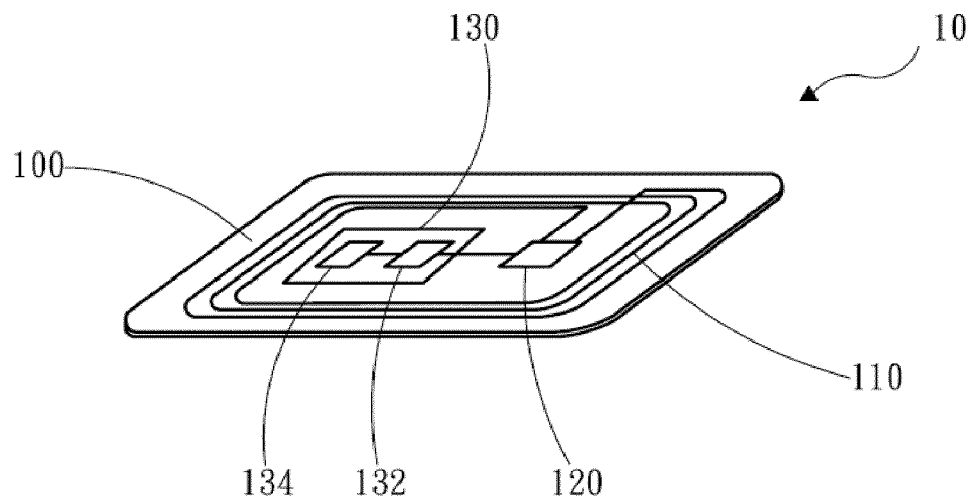
FIG. 2A is a perspective view of a composite chip card with a security protection interface according a first preferred embodiment of the present invention.
Figure 2B:
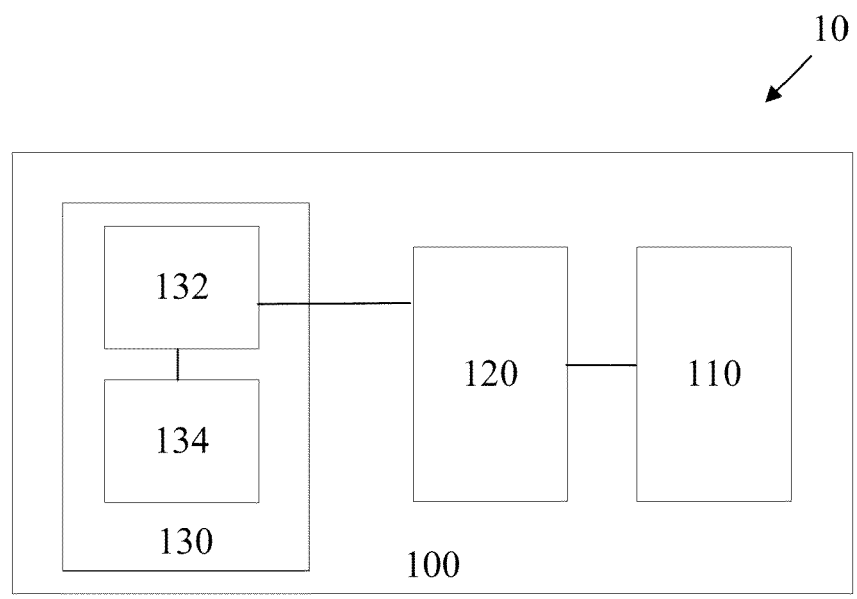
FIG. 2B is a block diagram of the composite chip card shown in FIG. 2A.

Please refer to FIG. 2A and FIG. 2B, which are respectively a perspective view and a block diagram of a composite chip card with a security protection interface according to the first preferred embodiment of the present invention. As shown in the drawings, a composite chip card 10 with a security protection interface 130 comprises a carrier 100. Provided on the carrier 100 are an induction coil 110, a chip module 120, and the security protection interface 130.

The induction coil 110 is capable of receiving and transmitting radio waves. The chip module 120 is electrically connected to the induction coil 110. The security protection interface 130 comprises a sensing-type security protection module 132 and a control unit 134. The sensing-type security protection module 132 is connected to the chip module 120 and is configured for controlling activation and operation of the chip module 120. The control unit 134 is connected to the sensing-type security protection module 132 and is configured for controlling operation of the sensing-type security protection module 132. The sensing-type security protection module 132 is configured to sense light, heat, human body resistance, or fingerprint. The control unit 134 sets and stores an actuation condition of the sensing-type security protection module 132 so as to activate or deactivate security protection functions of the sensing-type security protection module 132.

In the first preferred embodiment, the sensing-type security protection module 132 is a light-sensing, heat-sensing, human body resistance-sensing, or fingerprint-sensing security protection module 132 as appropriate. The principles and implementation methods of these sensing techniques are described as follows.

Generally, a light-sensing security protection module is designed to sense visible or infrared light. Since visible light comes from natural light sources, a visible light-sensing security protection module only needs to be exposed to visible light to activate a security protection mechanism and thereby enable transaction. In other words, when the chip card 10 is put away in a purse or pocket and therefore blocked from light, the light-sensing security protection module which is not exposed to visible light will not allow transaction. Transaction is allowed only when the chip card 10 is taken out of the purse or pocket and exposed to visible light. Thus, the risk of the chip card 10 being remotely copied and cracked for fraudulent use is significantly reduced. And this is the advantage of the visible light-sensing security protection module in use.

On the other hand, infrared light exhibits the collimating property of light and the secretive nature of invisible light. Therefore, an infrared light can be properly modulated to have superior resistance against noise interference. The advantage of using an infrared light-sensing security protection module is that, whether the chip card 10 is exposed to visible light or not, the security protection module will not enable transaction as long as there is no infrared illumination. Hence, the infrared light-sensing security protection module provides a higher level of security than the visible light-sensing security protection module.

A heat-sensing security protection module is explained below. As the normal human body temperature ranges from 35° C. to 38° C., the control unit 134 is configured for setting and storing a user's normal range of body temperature. Only when the heat-sensing security protection module contacts with a user's skin and detects a body temperature that matches the information stored in the control unit 134 will the security protection module enable transaction. Thus, the security of use of the chip card 10 is increased, and the chances of its being remotely copied or cracked for fraudulent use are minimized.

Next, a human body resistance-sensing security protection module is described as follows. Generally, the human skin has a resistance of ten thousand to a million ohm. Therefore, as in the case with the heat-sensing security protection module, the control unit 134 is similarly configured for setting and storing a user's skin resistance under normal conditions. Only if the human body resistance-sensing security protection module is in contact with a user's skin and detects a resistance that matches the information stored in the control unit 134 will the security protection module enable transaction. Consequently, the security of use of the chip card 10 is enhanced as the chip card 10 is prevented from being remotely copied or cracked for unauthorized use.

Finally, a fingerprint-sensing security protection module is described as follows. The control unit 134 is configured for setting and storing a user's fingerprints. Only when the fingerprint-sensing security protection module contacts with a user's finger and determines that the fingerprint detected conforms to the information stored in the control unit 134 will the security protection module enable transaction. Therefore, the chip card 10 is enhanced in security and prevented from being remotely copied or cracked for unauthorized use.

Figure 3A:
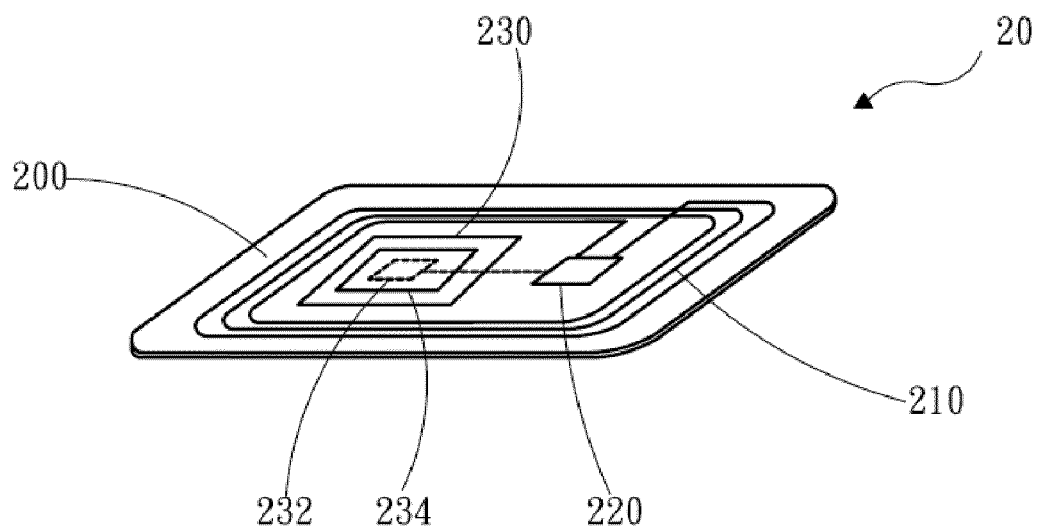
FIG. 3A is a perspective view of a composite chip card with a security protection interface according to a second preferred embodiment of the present invention.
Figure 3B:
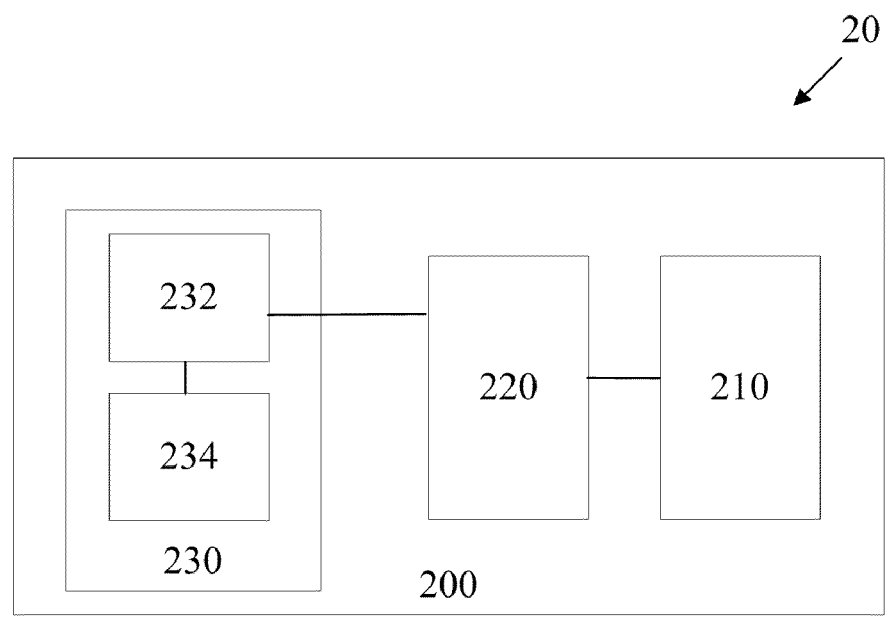
FIG. 3B is a block diagram of the composite chip card shown in FIG. 3A.

Please refer to FIG. 3A and FIG. 3B for a perspective view and a block diagram of a composite chip card with a security protection interface according to the second preferred embodiment of the present invention, respectively. As shown in the drawings, a composite chip card 20 with a security protection interface 230 comprises a carrier 200. Provided on the carrier 200 are an induction coil 210, a chip module 220, and the security protection interface 230.

As in the first preferred embodiment, the induction coil 210 is capable of receiving and transmitting radio waves, and the chip module 220 is electrically connected to the induction coil 210. The security protection interface 230 comprises a mechanical security protection module 232 and a control unit 234. The mechanical security protection module 232 is connected to the chip module 220 and configured for controlling activation and operation of the chip module 220. The control unit 234 is connected to or covers the mechanical security protection module 232 so as to control operation of the mechanical security protection module 232. The mechanical security protection module 232 is of a pressing type or a pressure-measuring type and has security protection functions which are activated, deactivated, or controlled by the control unit 234.

In the second preferred embodiment, the mechanical security protection module 232 is a pressing-type security protection module 232' or a pressure-measuring security protection module 232". The principles and implementation methods of the aforesaid mechanical operations are described as follows.

Figure 4:
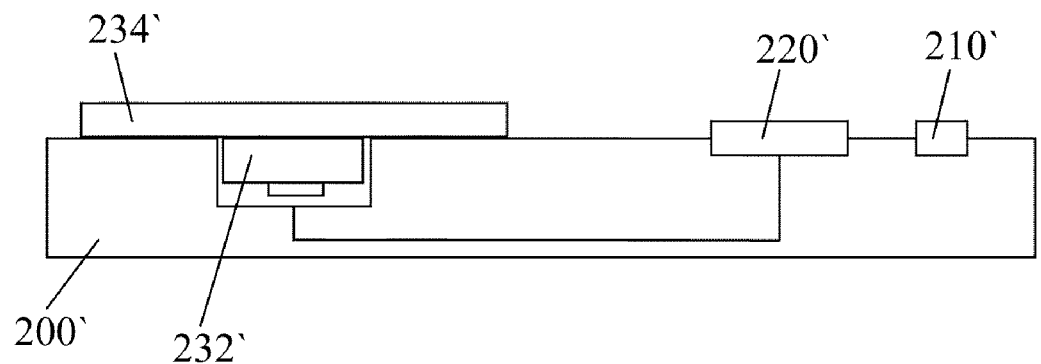
FIG. 4 is a schematic sectional view of a pressing-type security protection module according to the present invention.

Please refer to FIG. 4 for the pressing-type security protection module 232', wherein the pressing-type security protection module 232' is covered by a control unit 234'. When no transaction is to be carried out, the pressing-type security protection module 232' is not in electrical connection with a chip module 220'. However, when an external force is applied to the control unit 234', the pressing-type security protection module 232' is changed in position mechanically in response to the external force so as to connect electrically with the chip module 220'. As a result, a security protection mechanism is activated to enable transaction.

Figure 5:
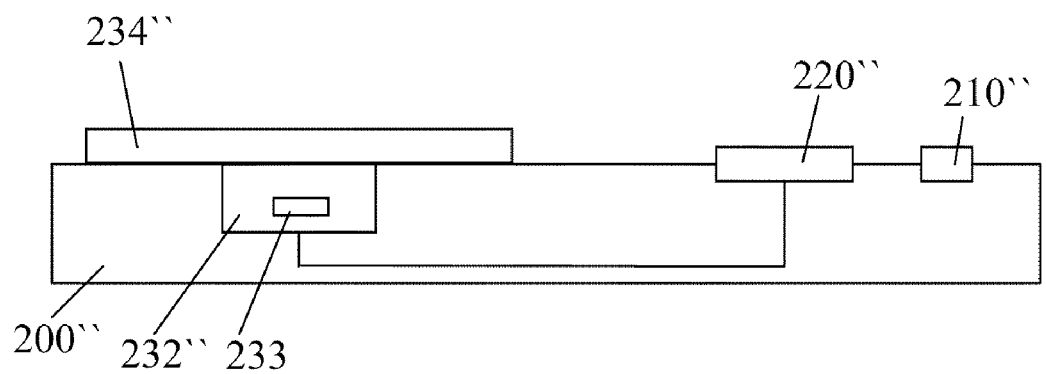
FIG. 5 is a schematic sectional view of a pressure-measuring security protection module according to the present invention.

Referring to FIG. 5 for the pressure-measuring security protection module 232", the pressure-measuring security protection module 232" is covered by a control unit 234" and further comprises a pressuring-measuring unit 233. When an external force is applied to the control unit 234", the pressuring-measuring unit 233 of the pressuring-measuring security protection module 232" is subjected to an applied pressure. When the pressure exceeds a value preset with the pressuring-measuring security protection module 232", the pressuring-measuring security protection module 232" is electrically connected to a chip module 220" so as to activate a security protection mechanism and thereby enable transaction.

Furthermore, as the composite chip card 20 is usually placed in a wallet, which is then put in a user's pocket, when the user moves or when the user inserts his or her hand in the pocket, it is very likely that the mechanical security protection module 232 will be unintentionally touched. In consequence, the security protection mechanism will be activated, thereby exposing the composite chip card 20 to the risk of being fraudulently used or remotely copied. As a countermeasure, the chip module 220 is further connected to a sensing-type security protection module (as the one indicated at 132 in FIG. 2A and FIG. 2B), and the control unit 234 is connected to the sensing-type security protection module so as to control operation thereof, wherein the sensing-type security protection module is a light-sensing, heat-sensing, human body resistance-sensing, or fingerprint-sensing security protection module. The control unit 234 is configured for setting and storing an actuation condition of the sensing-type security protection module so as to activate or deactivate security protection functions of the sensing-type security protection module.

Hence, with two security protection mechanisms in place, even if the mechanical security protection module 232 is touched by accident and thus activates one security protection mechanism, the sensing-type security protection module still restrains the other security protection mechanism from activation, thereby effectively reducing the risk of the composite chip card 20 being illicitly used or remotely copied.

In addition to the foregoing composite chip card with the security protection interface, the present invention also provides a method for controlling a composite chip card with a security protection interface. Essential steps of a preferred embodiment of the method are now described in detail with reference to FIG. 6.

Figure 6:
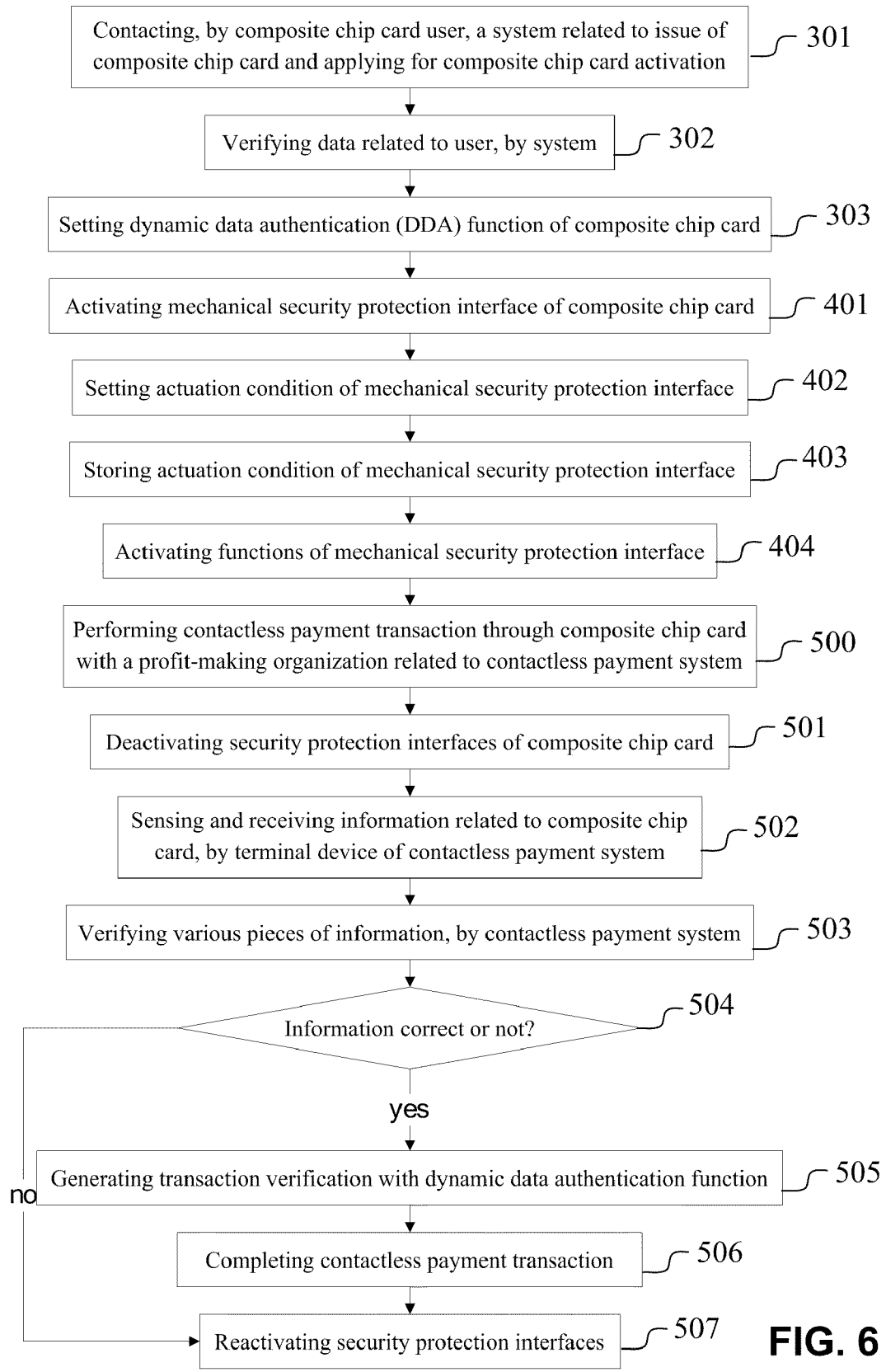
FIG. 6 is a flowchart of a method for controlling a composite chip card with a security protection interface according to the present invention.

As shown in FIG. 6, for a composite chip card to be used in a contactless payment transaction, a user of the composite chip card contacts a system related to issue of the composite chip card and applies for activation of the composite chip card at Step 301; Step 302, in which data related to the user is verified; and Step 303, in which a dynamic data authentication function of the composite chip card is set.

Then, at Step 401, a mechanical security protection interface of the composite chip card is activated; Step 402, in which an actuation condition of the mechanical security protection interface of the composite chip card (e.g., pressing the mechanical security protection interface once or applying a predetermined pressure to the mechanical security protection interface) is set in advance; Step 403, in which the actuation condition of the mechanical security protection interface is stored; and Step 404, in which functions of the mechanical security protection interface are activated.

Following Step 403 is a step of activating a sensing-type security protection interface of the composite chip card. This step includes setting an actuation condition of the sensing-type security protection interface of the composite chip card (e.g., sensing an ambient light, sensing an ambient temperature, sensing a human body resistance, and detecting a fingerprint) in advance; storing the actuation condition of the sensing-type security protection interface; and then activating functions of the sensing-type security protection interface.

Next, at Step 500, a contactless payment transaction is carried out through the composite chip card with a profit-making organization related to a contactless payment system. At Step 501, the security protection interfaces of the composite chip card are deactivated. At Step 502, a terminal device of the contactless payment system senses and receives information related to the composite chip card, including various pieces of the user's personal information and various pieces of information related to the contactless payment transaction. After the various pieces of the aforementioned information are verified by the contactless payment system at Step 503, it is determined at Step 504 whether or not the various pieces of the user's personal information and the various pieces of information related to the contactless payment transaction are correct. If the aforementioned information is completely correct, values of the aforementioned information are accepted, and the process goes on to Step 505. If any piece of the aforementioned information is incorrect, the process goes directly to the final step.

At Step 505, a transaction verification for the contactless payment transaction is generated via the dynamic data authentication function, wherein the transaction verification is a single, independent transaction verification. The transaction verification is displayed or directly printed out by the terminal device of the contactless payment system. After that, the contactless payment transaction is completed at Step 506. Finally, the security protection interfaces of the composite chip card are reactivated at Step 507.

As described above, the present invention demonstrates industrial applicability, novelty, and non-obviousness, thus meeting the requirements for patent application. In addition, it should be noted that the preferred embodiments disclosed herein are not intended to limit the scope of the present invention. All equivalent changes or modifications which not depart from the spirit of the present invention should be encompassed by the appended claims.

What is claimed is:

1. A composite chip card with a security protection interface, the composite chip card comprising:
   a carrier;
   at least one induction coil configured for receiving and transmitting electric waves and provided on the carrier;
   at least one chip module provided on the carrier and electrically connected to the induction coil configured for receiving and transmitting electric waves; and
   at least one security protection interface being provided on the carrier and comprising:
     a mechanical security protection module connected to the chip module and configured for controlling activation and operation of the chip module;
     a sensing-type security protection module, being a heat-sensing security protection module connected to the chip module and configured for controlling the activation and the operation of the chip module, the sensing-type security protection module being connected to the control unit, such that the control unit is able to control operation of the sensing-type security protection module; and
     a control unit connected to the mechanical security protection module and configured for controlling operation of the mechanical security protection module.

2. The composite chip card of claim 1, wherein the mechanical security protection module is one of a pressing-type security protection module and a pressure-measuring security protection module.

3. The composite chip card of claim 1, wherein the sensing-type security protection interface is a human body resistance-sensing security protection module.

4. A method for controlling a composite chip card with a security protection interface, wherein the method is applicable to contactless payment transaction and comprises the steps of:
   (A) contacting, by a user of the composite chip card, a system related to issue of the composite chip card so as to activate the composite chip card;
   (B) activating a mechanical security protection interface of the composite chip card, wherein the step (B) comprises:
     (Ba) setting an actuation condition of the mechanical security protection interface of the composite chip card;
     (Bb) storing the actuation condition of the mechanical security protection interface; and
     (Bc) activating the mechanical security protection interface;
   (C) activating a sensing-type security protection interface of the composite chip card, wherein the step (C) comprises:
     (Ca) setting an actuation condition of the sensing-type security protection interface of the composite chip card in advance;
     (Cb) storing the actuation condition of the sensing-type security protection interface; and
     (Cc) activating functions of the sensing-type security protection interface; and
   (D) performing a contactless payment transaction through the composite chip card with a profit-making organization related to a contactless payment system.

5. The method of claim 4, wherein the actuation condition of the sensing-type security protection interface is selected from the group consisting of: sensing an ambient light, sensing an ambient temperature, sensing a human body resistance, and detecting a fingerprint.

6. The method of claim 4, wherein the activating the composite chip card comprises:
   (Aa) verifying data related to the user; and
   (Ab) setting a dynamic data authentication function of the composite chip card.

7. The method of claim 4, wherein the step (D) further comprises steps of:
   (Da) deactivating the security protection interface of the composite chip card;
   (Db) sensing and receiving information related to the composite chip card through a terminal device of the contactless payment system, wherein the information related to the composite chip card comprises various pieces of information related to the user and various pieces of information related to the contactless payment transaction;
   (Dc) verifying the various pieces of information by the contactless payment system;
   (Dd) generating a transaction verification for the contactless payment transaction, via the dynamic data authentication function;
   (De) completing the contactless payment transaction; and
   (Df) reactivating the security protection interface of the composite chip card.

8. The method of claim 7, wherein the step (Dc) further comprises the determination of whether the various pieces of information related to the user and the various pieces of information related to the contactless payment transaction are correct; executing the step (Dd) if all the pieces of information are completely correct; and executing the step (Df) if any said piece of information is incorrect.

9. The method of claim 7, wherein the transaction verification generated in the step (Dd) is a single, independent transaction verification.

10. The method of claim 7, wherein the transaction verification generated in the step (Dd) is displayed or printed out by the terminal device of the contactless payment system.

* * * * *